(12) United States Patent
Kumar

(10) Patent No.: US 11,653,104 B2
(45) Date of Patent: May 16, 2023

(54) MANAGEMENT OF VIDEO DATA PROCESSING RESOURCES ACROSS MULTIPLE PROCESSING LOCATIONS

(71) Applicant: DRAGONFRUIT AI, INC, Menlo Park, CA (US)

(72) Inventor: Amit Kumar, Menlo Park, CA (US)

(73) Assignee: DRAGONFRUIT AI, INC., Menlo Park, CA (US)

( * ) Notice: Subject to any disclaimer, the term of this patent is extended or adjusted under 35 U.S.C. 154(b) by 251 days.

(21) Appl. No.: 16/782,624

(22) Filed: Feb. 5, 2020

(65) Prior Publication Data
US 2021/0243364 A1 Aug. 5, 2021

(51) Int. Cl.
*H04N 5/232* (2006.01)
*G06F 9/50* (2006.01)

(52) U.S. Cl.
CPC ....... *H04N 5/23229* (2013.01); *G06F 9/5044* (2013.01)

(58) Field of Classification Search
CPC .......... H04N 5/23203–23206; H04N 5/23229–23235; H04N 5/247; H04N 7/18–186; H04N 21/24–2408; G06F 9/50–5094
See application file for complete search history.

(56) References Cited

U.S. PATENT DOCUMENTS

| | | | |
|---|---|---|---|
| 10,986,301 B1 * | 4/2021 | Schanz | H04S 7/303 |
| 2011/0110608 A1 * | 5/2011 | Jung | H04N 5/23241 382/299 |
| 2018/0276049 A1 * | 9/2018 | Kattepur | G06F 11/3428 |
| 2019/0273866 A1 * | 9/2019 | Abalos | H04N 5/23216 |
| 2021/0018938 A1 * | 1/2021 | Qian | G01S 19/42 |

* cited by examiner

*Primary Examiner* — Paul M Berardesca

(57) ABSTRACT

Systems, methods, and software described herein manage video data processing resources for video data obtained from one or more sources. In one implementation, a management system may monitor processing requirements for the video data and computing resources available at multiple video processing locations. The management system may further allocate processing operations to the video processing locations based on the processing requirements for the video data and computing resources available at the video processing locations.

17 Claims, 8 Drawing Sheets

MANAGEMENT OF VIDEO DATA PROCESSING RESOURCES ACROSS MULTIPLE PROCESSING LOCATIONS

BACKGROUND

Video data can be generated in a variety of different formats to support various different applications. These different formats may include different resolutions, different frame rates, different color gradients, or some other different formatting. As the video data is generated, the data may be imported to a computing device or devices to support editing, surveillance, or other operations in association with the video data. However, as the formats require increased storage space to accommodate higher quality video, it can become difficult and cumbersome for end users generating the video to store and manage the different video files from the video sources.

In some examples, users, such as individuals or organizations, may further prefer to distribute and/or backup the captured video data by storing at least a portion locally, as well as in a remote computing device or cloud storage provider. However, determining what video should remain local and what video to provide to the remote storage device or provider can be difficult on the user associated with the video data. These difficulties can be compounded when determining where video data should be processed to most efficiently provide the desired operation.

OVERVIEW

Provided herein are systems, methods, and software for managing video data processing resources. In one implementation, a method includes monitoring processing requirements associated with video data from one or more video sources and monitoring computing resources available at a first video processing location and at least one second video processing location. The method further provides allocating first video processing operations to the first video processing location and second video processing operations to the at least one second video processing location based on the monitored processing requirements and monitored computing resources.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
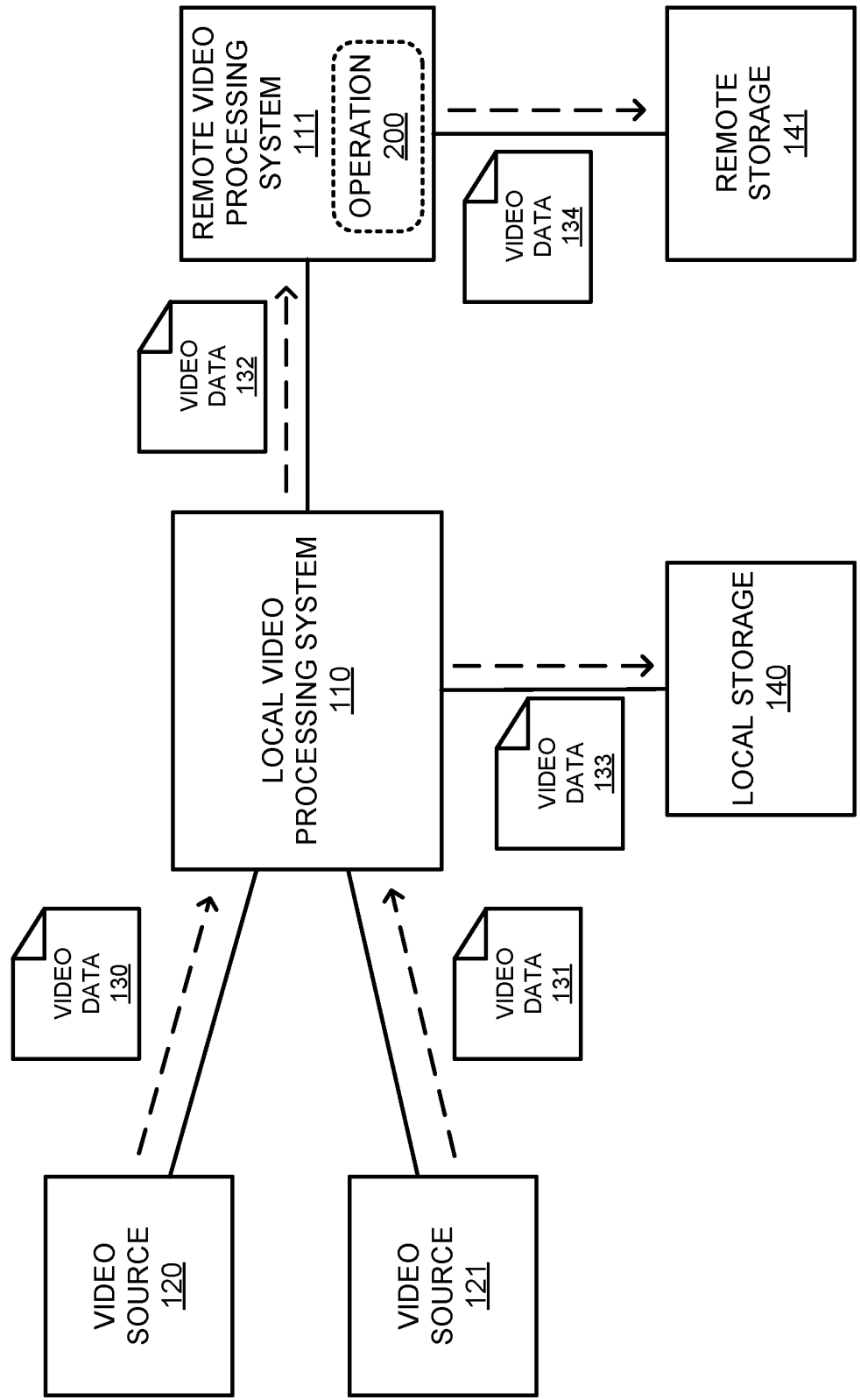
FIG. 1 illustrates computing network to manage processing resources for video data according to an implementation.

FIG. 1 illustrates computing network 100 to manage processing resources for video data according to an implementation. Computing network 100 includes video sources 120-121, local video processing system 110, remote video processing system 111, local storage 140, and remote storage 141. Computing network 100 further includes video data 130-134 that is processed and stored by processing systems 110-111. Remote processing system 111 provides operation 200 that is further described below with respect to FIG. 2. Although demonstrated in remote processing system 111, it should be understood that operation 200 may be implemented in local video processing system 110, another monitoring system, or may be distributed across multiple systems in computing network 100.

In operation, local video processing system 110 obtains video data 130-131 from video sources 120-121, wherein video sources 120-121 may represent cameras, storage devices, such as disk drives, solid state storage, Secure Digital (SD) cards, or some other video source. Local video processing system 110 may be coupled with the camera, a computing system or some other video data processing device. Local video processing system 110 may be located on a camera or cameras associated with video sources 120-121, may be located on a desktop computer or laptop computer, or may be located one some other computing element. As the data is ingested by local video processing system 110, the data may be processed by local video processing system 110 to add metadata to the video, change the quality of the video, identify objects of interest in the video, compress the video, or provide some other operation with respect to the video. In some implementations, local video processing system 110 may store at least a portion of video data 130-131 as video data 133 in local storage 140. Video data 133 may be in the same format as video data 130-131, may be in a different format from video data 130-131, may include additional metadata, or may include some other information associated with the video data.

In some examples, local video processing system 110 may further provide video data 132 to remote video processing system 111, wherein video data 132 may comprise at least a portion of video data 130-131 and may further include metadata generated at least in part by local video processing system 110. Once obtained, remote video processing system 111 may support additional operations on the video data and may store video data 134 in remote storage 141. In some examples, remote video processing system 111 and remote storage 141 may represent a data center or some other remote computing service. In some implementations local video processing system 110 may operate on a local area network with video sources 120-121 and may be closer in physical proximity to video sources 120-121, whereas remote video processing system 111 may execute in a cloud computing site or some other remote computing site.

Here, in addition to providing video operations on the video data from video sources 120-121, computing network 100 may further dynamically modify where the various video operations are provided. In at least one example, processing requirements may be identified for the video data from video sources 120-121, wherein the processing requirements may include operations to identify objects of interest in the video data, modify the format of the video data, provide color correction to the video data, video storage, or provide some other function in association with the video data. The processing requirements may be specified by an administrator, wherein the administrator may define the various operations to be performed on the data. In addition to the processing requirements, computing network 100 may further monitor computing resources available for local video processing system 110 and remote processing system 111, wherein the resources may include computer processing unit (CPU) availability, memory availability, storage availability, and the like. From the processing requirements and the resource availability, video processing operations may be allocated to local video processing system 110 and remote processing system 111 to efficiently implement the desired processing requirements for the video data from the video sources.

Figure 2:
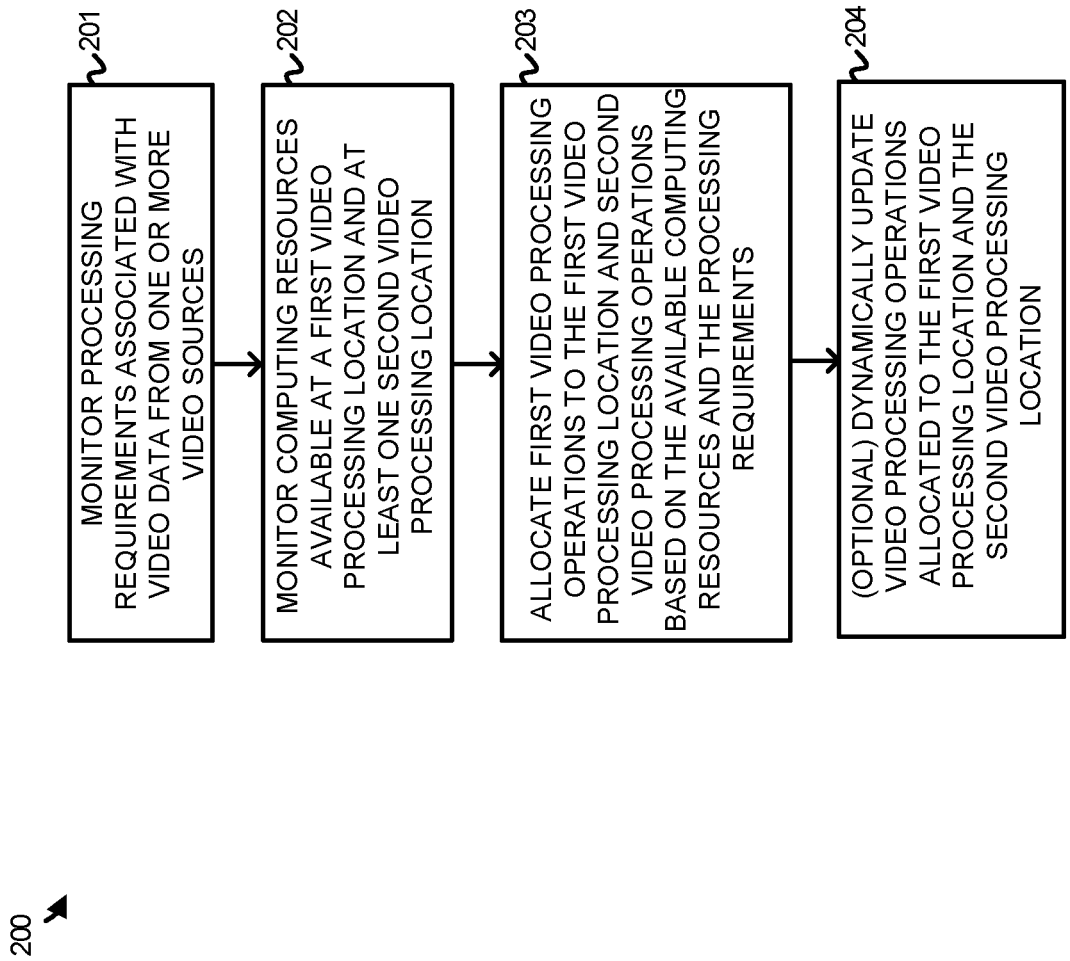
FIG. 2 illustrates an operation to manage and allocate processing resources for video data according to an implementation.

FIG. 2 illustrates an operation 200 to manage and allocate processing resources for video data according to an implementation. The steps of operation 200 are referenced parenthetically in the paragraphs that follow with reference to systems and elements of computing network 100 of FIG. 1. Although demonstrated as being implemented remote video processing system 111, operation 200 may be implemented in local video processing system 100 or can be distributed across multiple systems.

As depicted, operation 200 includes monitoring (201) processing requirements associated with video data from one or more video sources. The processing requirements may indicate the various operations that are required to provide a desired end result for a user associated with the video data. The processing requirements may include format modifications, metadata generation, image analysis to identify objects of interest, compression, image optimization, or some other operation. In some implementations, the processing requirements may be determined based on code provided by a user, wherein the code may be traversed to determine the memory requirements, processing requirements, or other similar requirements for the application. In other implementations, the user may provide information about a minimum quality of service associated with video/ image processing, such as storage requirements, processing requirements, processing time requirements, or some other requirement for processing video data 130-131.

In addition to the processing requirements, operation 200 further monitors (202) computing resources available at a first video processing location and at least one second video processing location. Referring to an example from computing network 100, remote processing system 111 may determine the available CPU resources at local video processing system 110 and remote video processing system 111, may determine available storage in local storage 140 and remote storage 141, may determine memory available at local video processing system 110 and remote video processing system 111, or may determine some other computing resource associated with the various processing locations for the video data.

After determining the processing requirements and the available computing resources, operation 200 further allocates (203) first video processing operations to the first video processing location and second video processing operations to the at least one second video processing location based on the monitored processing requirements and monitored computing resources. As an illustrative example, an application of a user may require that video data 130-131 is stored in its full non-compressed format in at least one of local storage 140 or remote storage 141 and that at least some lower quality version of the video data is stored at local storage 140. Based on the requirements for the application, operation 200 may determine the available storage at local storage 140 and determine how the video data should be stored and processed by local video processing system 110. This may include defining a file format for the storage of data at local storage 140, defining a frame rate for the video data, defining a resolution for the video data, or providing some other limitation for the data. As a result, when video data 130-131 is received by local video processing system 110, the video data may be processed and stored in accordance with the limitations of local storage 140. Additionally, video data 132, which may include additional data, such as time stamps or other metadata, may be supplied to remote video processing system 111, permitting the storage of the video data in remote storage 141.

In some implementations, operation 200 may dynamically update (204) the video processing operations allocated to the first video processing location and the at least one second video processing location. In some examples, a first video processing location that initially receives the video data may process the video data to identify objects of interest or video portions of interest. For example, local video processing system 110 may determine that a portion of video data 130 requires an additional operation. In response to identifying the video portion of interest, local video processing system may notify operation 200 of the portion of interest and operation 200 may adjust operations at processing systems 110-111 to reflect the notification. For example, operation 200 may initiate a new video processing operation at remote video processing system 111 to provide additional video analysis on the portion of interest.

In another implementation, the computing resources available for processing the video data may change as a function of other applications executed at the first processing location or the one or more second processing locations. For example, local video processing system 110 may comprise a user workstation that can be used for additional applications outside of processing data from video sources 120-121. When the applications are using additional resources, operation 200 may modify the configuration for the application such that operations are provided by remote video processing system 111 over local video processing system 110.

In some examples, operation 200 may further monitor networking conditions between local video processing system 110 and remote video processing system 111. These networking conditions may include bandwidth, latency, or some other networking condition, including combinations thereof. When the networking conditions satisfy criteria, operation 200 may modify the operations provided by local video processing system 110 and/or remote video processing system 111. For example, if the networking conditions satisfy criteria, local video processing system 110 may be required by operation 200 to change video processing operations to a lesser quality that are provided to remote video processing system 111. This may include altering the format associated with video data 132, altering the frame rate associated with video data 132, or providing some other operation to limit the quantity of data between local video processing system 110 and remote video processing system 111. In some examples, local video processing system 110 may cache the video data for a period of time, then transmit the video data to remote video processing system 111 when the networking conditions improve.

Figure 3A:
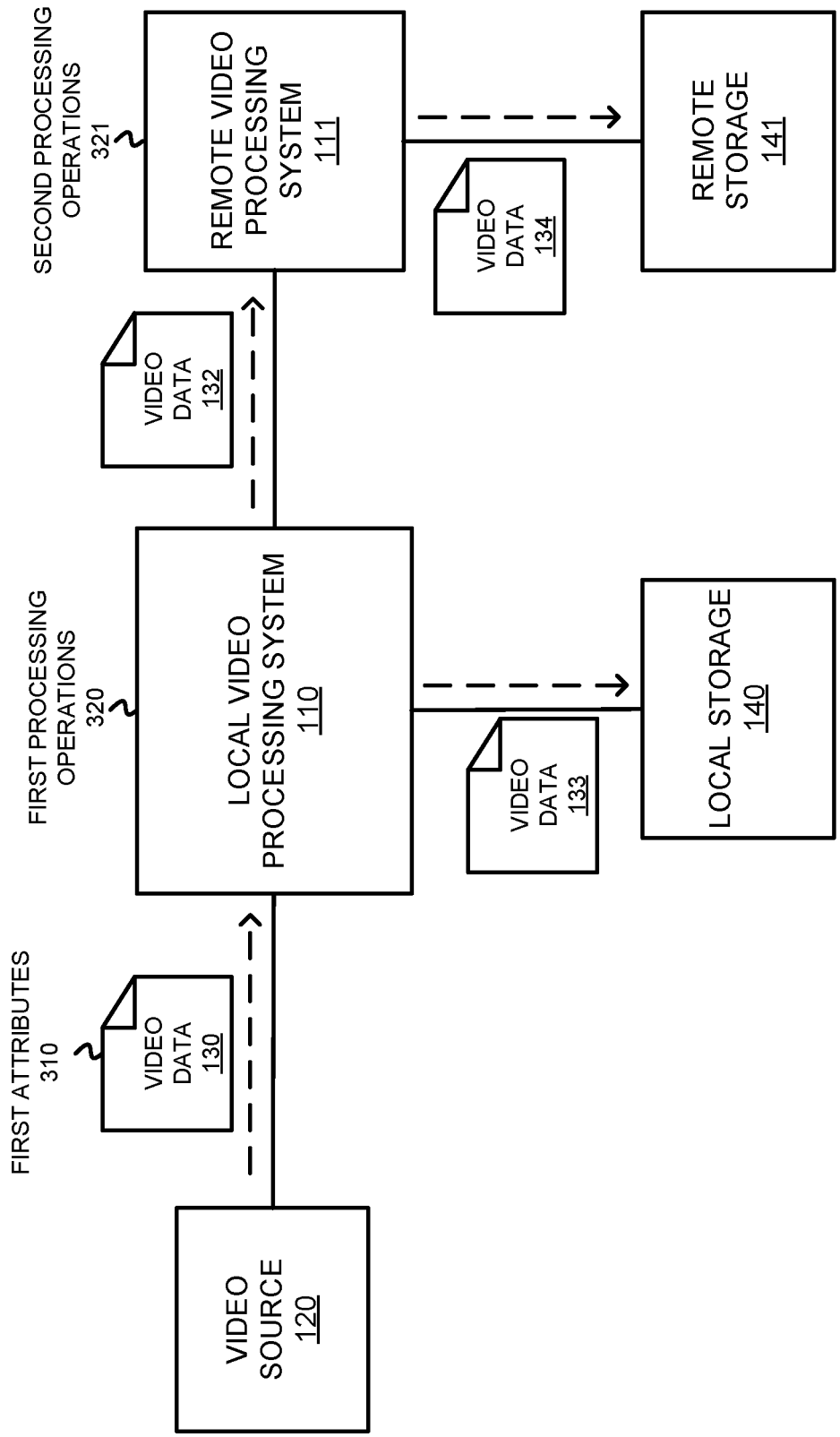
FIGS. 3A-3B illustrate an operational scenario of modifying video processing operations at multiple processing locations according to an implementation.
Figure 3B:
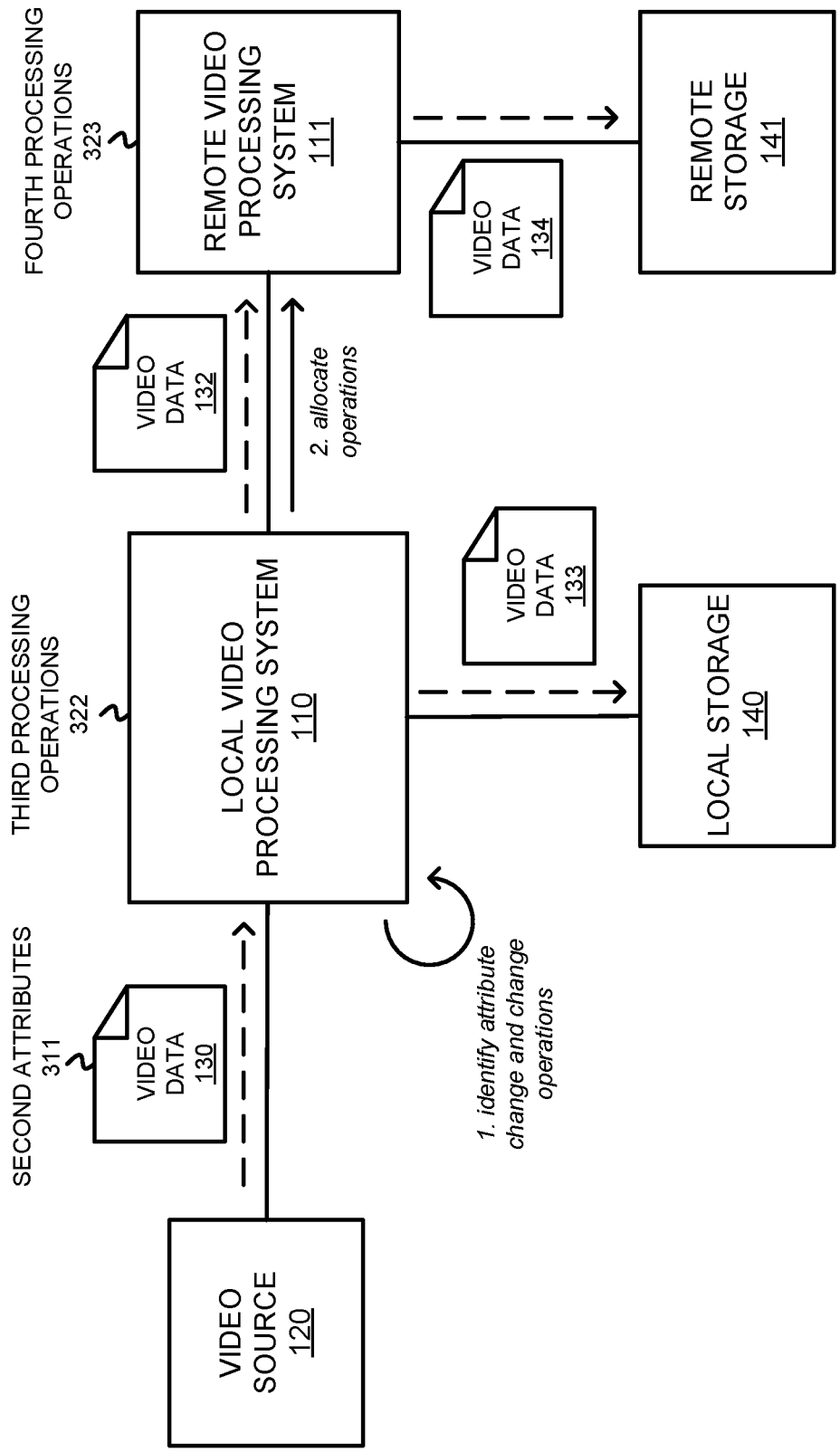

FIGS. 3A-3B illustrate an operational scenario of modifying video processing operations at multiple processing locations according to an implementation. The operational scenario includes video source 120, local video processing system 110, remote video processing system 111, local storage 140, remote storage 141, and video data 130 and 132-134 from computing network 100 of FIG. 1. FIG. 3A further includes first attributes 310, first process operation 320, and second process operations 321. FIG. 3B further includes second attributes 311, third process operations 322, and fourth process operations 323.

Referring first to FIG. 3A, a management operation, executing on at one of processing systems 110-111 or a separate management system, may monitor processing requirements associated with a video data application and physical resources available for providing the video data application at local video processing system 110 and remote video processing system 111. The processing requirements may include various operations, including encoding video data, identifying objects of interest, generating metadata for the video data, or providing some other similar operation. Additionally, the management operation may identify the availability of computing resources to support the application, wherein the computing resources may include CPU resources, memory resources, storage resources (local storage 140 and remote storage 141), or some other similar resource. Based on the resources available and the processing requirements associated with the application for the video data, the management operation may allocate first processing operations 320 to local video processing system 110 and second processing operations 321 to remote video processing system 111.

In at least one implementation, the management operation may dynamically allocate processing operations based on attributes identified within the video data. These attributes may include identifying an object of interest, identifying changes in the images of the video data (e.g., changes in light or objects in the image), or identifying some other modification to the attributes in the video data.

Turning to FIG. 3B, video data 130 changes from first attributes 310 to second attributes 311. Local video processing system 110 may identify, at step 1, the attribute change and determine whether to modify processing operations at local video processing system 110 or remote video processing system 111. Here, as a result of the change to second attributes 311, local video processing system 110, acting as the management system, may allocate, at step 2, third processing operations 322 to local video processing system 110 and further processing operations 323 remote video processing system 111.

As an example, first processing operations 320 on local video processing system 110 may monitor for an object of interest in video data 130. In response to identifying the object of interest, local video processing system 110 may determine that additional operations are required on the video data and may allocate additional or replacement operations to each of local video processing system 110 and remote video processing system 111. These operations may be used to store higher quality versions of the video data in local storage 140 and/or remote storage 141, generate additional metadata for the video data, such as identifying the object of interest or flagging the object of interest for a future administrator interaction, comparing the video data to previously capture video data, or providing some other operation. In at least one implementation, the allocation of third processing operations 322 and fourth processing operations 323 may be based on the processing requirements for the operations and the available resources at each of the processing locations.

Figure 4A:
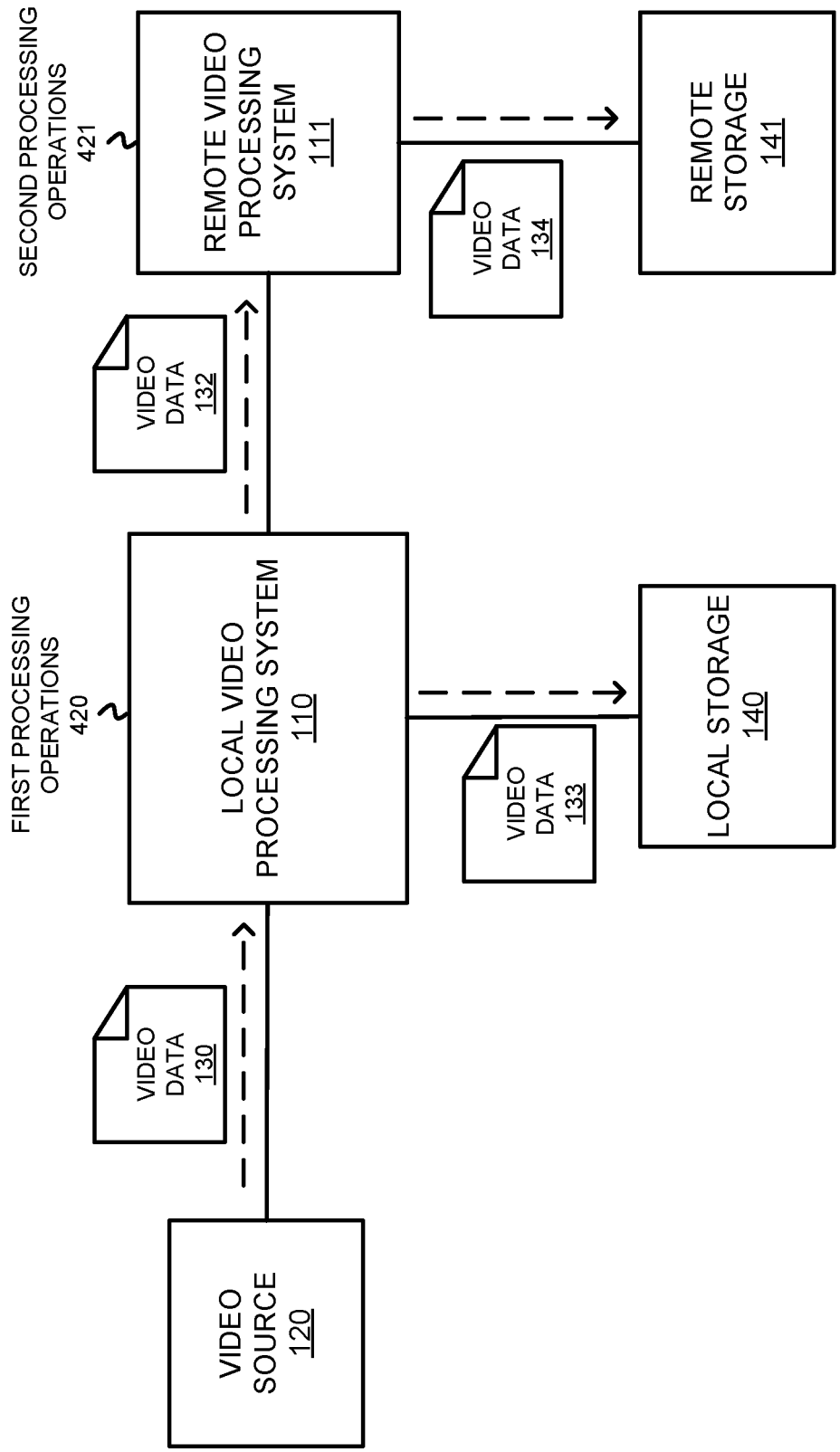
FIGS. 4A-4B illustrate an operational scenario of modifying video processing operations at multiple processing locations according to an implementation.
Figure 4B:
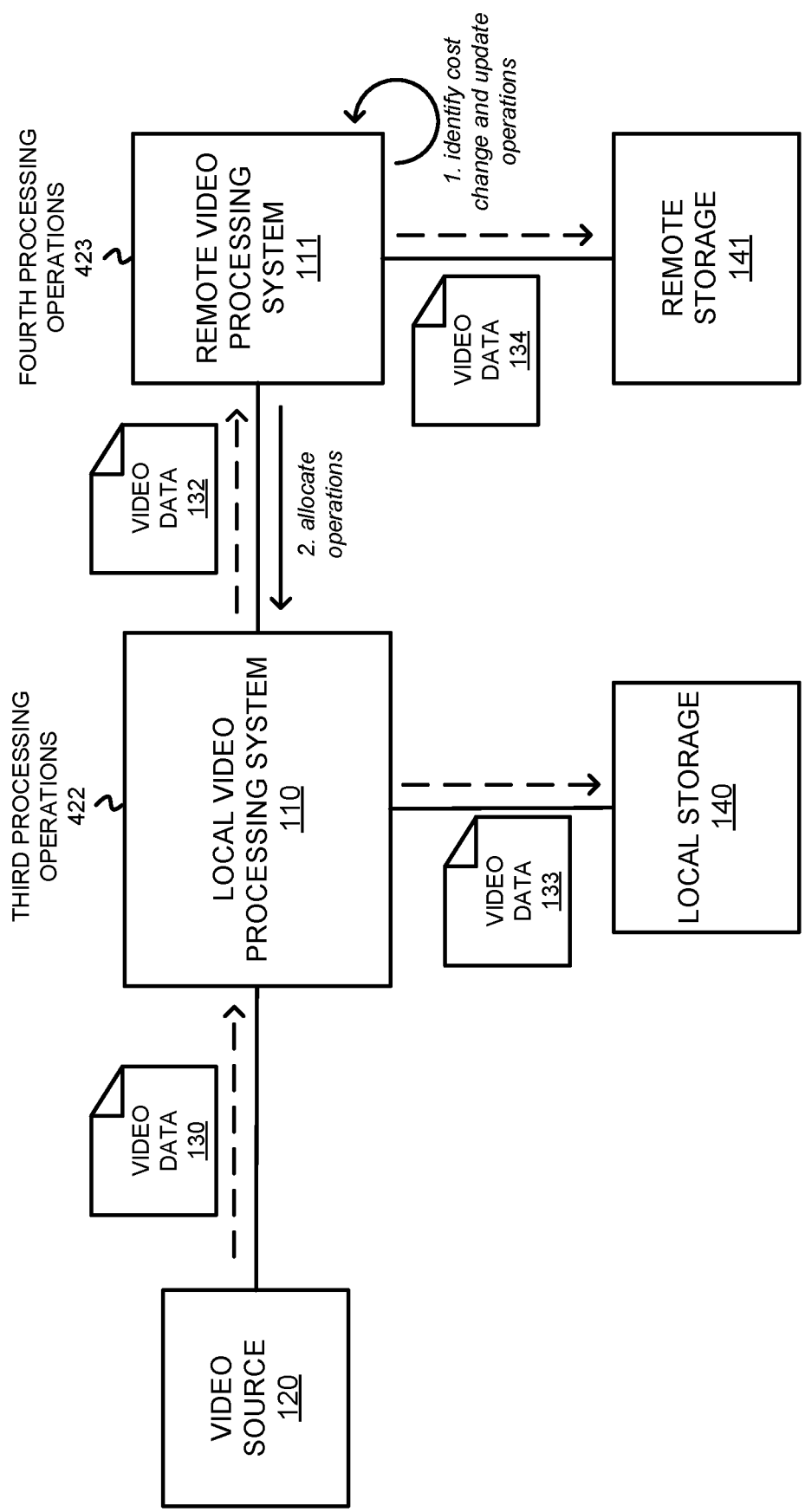

FIGS. 4A-4B illustrate an operational scenario of modifying video processing operations at multiple processing locations according to an implementation. The operational scenario includes video source 120, local video processing system 110, remote video processing system 111, local storage 140, remote storage 141, and video data 130 and 132-134 from computing network 100 of FIG. 1. FIG. 4A further includes first process operation 420 and second process operations 421. FIG. 4B further includes third process operations 422 and fourth process operations 423.

Referring first to FIG. 4A, a management operation executing on local video processing system 110, remote video processing system 111, a standalone management system, or some combination of systems may monitor processing requirements associated with video data 130. Additionally, the management operation may monitor computing resources available to processing systems 110-111 to determine how the various video processing operations should be allocated to each of the processing systems. As depicted, the management operation allocates first processing operations 420 to local video processing system 110 and second processing operation 421 to remote video processing system 111. For example, first processing operations 420 may be used to store video data 133 in a first format, wherein the format may comprise a first file type, resolution, frame rate, and the like. Additionally, second processing operations 421 may obtain video data 132 and store video data 134 in a second format that is higher quality than the first format. This second format may comprise a second file type, resolution, frame rate, and the like. Additionally, second processing operation 421 may provide additional operations on the video data, such as identifying objects of interest, generating metadata associated with the video data, providing video optimization, or providing some other operation.

Turning to FIG. 4B, FIG. 4B demonstrates a modification to the operations provided by processing systems 110-111. In particular, remote video processing system 111 may monitor and identify, at step 1, a cost change associated with the use of remote video processing system 111 and may update operations based on the cost change. In some implementations, the use of a data center or cloud computing environment may provide various costs on the organization. For example, a cloud computing provider may dynamically change processing costs based on the time of day, the amount of resources being used by the organization, or some other factor. Based on the changes in cost, the management operation may determine that changes should be made to the processing configuration associated with video data 130 from video source 120. Here, remote video processing system 111 identifies the change in cost and allocates, at step 2, third processing operations 422 to local video processing system 110 and fourth processing operations 423 to remote video processing system 111.

In some examples, various criteria may be defined for processing video data 130, including cost criteria for changing operations for video data 130. For example, while a first configuration may be implemented by the management system for video data 130, the management system may monitor when the cost exceeds a threshold value and redistribute the operations for the video data. This may include transitioning one or more operations from using the cloud computing resources to using one or more local computing devices. The transition between operations may also provide a notification to an administrator associated with the video data, wherein the notification may comprise a web interface, an email, a text, or some other notification demonstrating the change in configuration.

Although provided in the previous example as using cost to change operations performed by remote video processing system 111 and local video processing system 110, it should be understood that other criteria may be identified by remote video processing system 111 to change the processing configuration. These criteria may include resources exceeding a threshold value at remote video processing system 111, objects identified in the video data by remote video processing system 111, or some other criteria. Further, while demonstrated as being modified by remote video processing system 111, it should be understood that the management operations may be provided by local video processing system 110 or some other standalone management system. These systems may monitor processing resource availability, processing requirements for the video data, networking conditions, monetary conditions, or some other condition to initiate modifications to the operations at each of the video processing locations.

Figure 5:
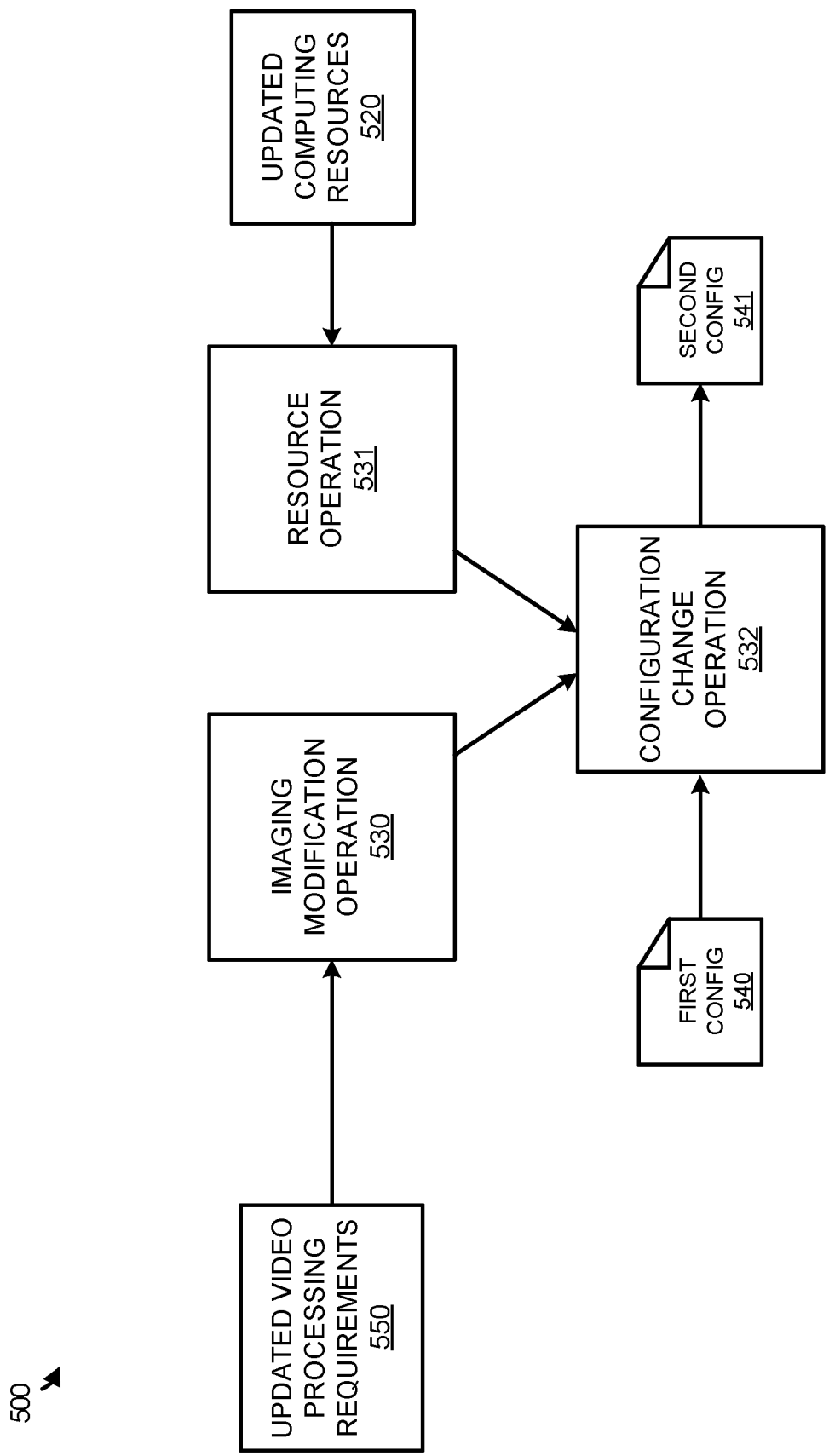
FIG. 5 illustrates an operational scenario of updating video processing configurations according to an implementation.

FIG. 5 illustrates an operational scenario 500 of updating video processing configurations according to an implementation. Operational scenario 500 includes, updated video processing requirements 550, imaging modification operation 530, resource operation 531, updated computing resources 520, configuration change operation 532, first configuration 540, and second configuration 541. Operations 530-532 are representative of operations that may be performed by a management system, wherein the management system may reside on one or more processing locations available for processing video data in a computing network and/or a standalone management system.

As described herein, a management system may obtain processing requirements associated with video data and monitor computing resources available to process the video data. Based on processing requirements and computing resources available, the management system may generate a first configuration 540 for processing the video data, wherein the first configuration may allocate video processing operations to two or more processing locations. In some examples, the processing locations may comprise a first location that is nearer in geographic proximity to the video source than a second location in some examples. In some examples, the management system may determine computing resources by obtaining resource information from the different video processing locations. In other examples, in addition to or in place of determining the available computing resources from the different processing locations, and administrator may define resources that are available to process the video data.

Once first configuration 540 is generated, imaging modification operation 530 may obtain updated video processing requirements 550 associated with processing video data from at least one video source. These updated processing requirements may include image optimization operations, format change operations, object of interest identification operations, or some other operations. Updated video processing requirements 550 may be provided by an administrator or may be determined at least in part from the video data of the one or more video sources. For example, an operation in first configuration 540 may identify an object of interest that requires additional processing via one or more additional operations, such as an imaging optimization operation. Imaging modification operation 530 may identify updated video processing requirements 550 and initiate configuration change operation 532.

While imaging modification operation 530 monitors for updates to the video processing requirements, resource operation 531 may monitor for updated computing resources 520. These resources may indicate the availability of CPU resources at the various processing locations, memory resources at the various processing locations, storage resources at the various processing locations, or some other computing resource. For example, resource operation 531 may determine that the CPU usage at a first processing location exceeds a threshold for the first processing location. In response to identifying updated computing resources 520, resource operation 531 may notify configuration change operation 532 to update first configuration 540 to second configuration 541.

In response to a notification from either of (or both) operations 530-531, configuration change operation 532 may identify changes to first configuration 540 to generate second configuration 541. The new configuration may change where operations are executed by the one or more processing locations, may change the types of operations that are executed, may change the resources allocated to each of the operations, or may provide some other modification to first configuration 540 to generate second configuration 541.

In one example, in response to imaging modification operation 530 indicating a request for a new operation, configuration change operation 532 may identify a processing location with resources available to accommodate the request. Once identified, configuration change operation 532 may allocate the new operation to the processing location. In an alternative example, an administrator associated with the imaging data may indicate that additional resources are located at a first processing location (e.g., storage resources). In response to the information provided by the administrator, configuration change operation 532 may add or update operations to use the additional resources. In some examples, these updates may include storing the video data in a different format, using a different frame rate, or some other update to use the additional resources.

In some implementations, changes to first configuration 540 may only occur when criteria are satisfied for a change. These criteria may include a requirement for a new operation, a threshold amount of computing resources being used at a processing location, or some other similar criteria. Once the criteria are satisfied, configuration change operation 532 may initiate the required processes to update first configuration 540 to second configuration 541. For example, to modify a configuration based on resources, configuration change operation 532 may determine whether CPU usage associated with one of the processing locations exceeds a threshold. Once exceeded, configuration change operation 532 may implement the required processes to reduce the load at the corresponding video processing location.

Although described in the previous example as updating the configuration based on computing resource availability and processing requirements for the video data, it should be understood that similar operations may be used to update the configuration based on costs associated with processing locations, networking conditions between the processing locations, or some other condition in a computing network. For example, the management system may monitor when processing costs associated with a remote video processing location exceed a threshold value. In response to exceeding the threshold value, the management system may reallocate the processing operations to a different video processing location, such as a processing location local to the video source.

Figure 6:
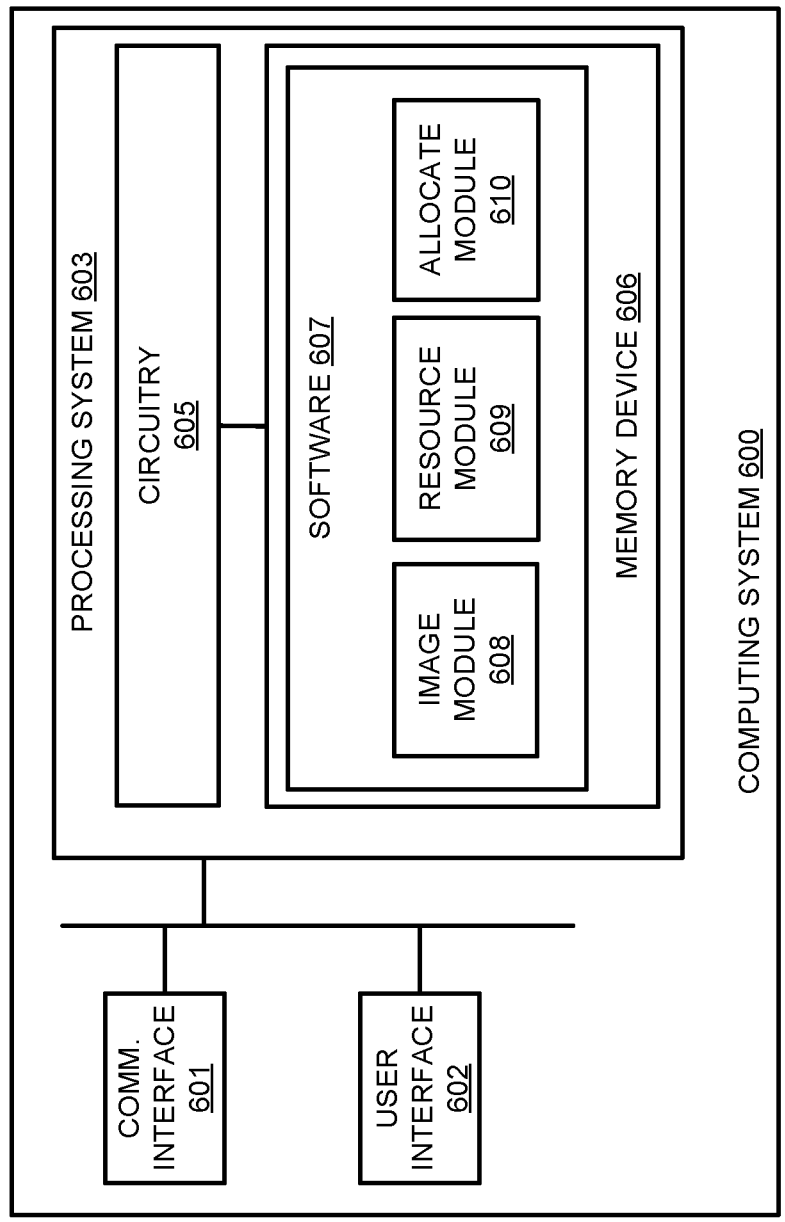
FIG. 6 illustrates a computing system to manage video processing operations according to an implementation.

FIG. 6 illustrates a computing system 600 to manage video processing operations according to an implementation. Computing system 600 is representative of any computing system or systems with which the various operational architectures, processes, scenarios, and sequences disclosed herein for a management system, such as remote video processing system 111 of FIG. 1. Computing system 600 comprises communication interface 601, user interface 602, and processing system 603. Processing system 603 is linked to communication interface 601 and user interface 602. Processing system 603 includes processing circuitry 605 and memory device 606 that stores operating software 607. Computing system 600 may include other well-known components such as a battery and enclosure that are not shown for clarity.

Communication interface 601 comprises components that communicate over communication links, such as network cards, ports, radio frequency (RF), processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In some implementations, communication interface 601 may be configured to communicate with one or more storage locations capable of storing video data in a variety of different formats. In some examples, communication interface 601 may communicate with a client device, wherein the client device may request video data from the various different storage locations. In some examples, communication interface 601 may communicate with one or more other computing systems at different locations to provide desired video processing operations for an end user.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. In some implementations, user interface 602 may permit a user to request and process various video data stored in multiple storage locations. User interface 602 may be omitted in some examples.

Processing circuitry 605 comprises microprocessor and other circuitry that retrieves and executes operating software 607 from memory device 606. Memory device 606 may include volatile and nonvolatile, removable and non-removable media implemented in any method or technology for storage of information, such as computer readable instructions, data structures, program modules, or other data. Memory device 606 may be implemented as a single storage device but may also be implemented across multiple storage devices or sub-systems. Memory device 606 may comprise additional elements, such as a controller to read operating software 607. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 605 is typically mounted on a circuit board that may also hold memory device 606 and portions of communication interface 601 and user interface 602. Operating software 607 comprises computer programs, firmware, or some other form of machine-readable program instructions. Operating software 607 includes image module 608, resource module 609, and allocate module 610, although any number of software modules may provide the same operation. Operating software 607 may further include an operating system, utilities, drivers, network interfaces, applications, or some other type of software. When executed by processing circuitry 605, operating software 607 directs processing system 603 to operate computing system 600 as described herein.

In one implementation, image module 608 directs processing system 603 to monitor image processing requirements associated with video data from one or more video sources. These processing requirements may include image optimization, image storage optimization, image processing, or some other operation associated with the video data from the one or more video sources. Additionally, resource module 609 directs processing system 603 to monitor computing resources available at various video processing locations, wherein the resources comprise CPU resources, memory resources, storage resources, or some other resources. In some implementations, resource module 609 may obtain availability information from the various video processing locations, however, an administrator may define preferences regarding the resources available at one or more of the video processing locations.

As the video processing requirements and computing resources are monitored, allocate module 610 directs processing system 603 to allocate video processing operations to each of the processing locations based on the processing requirements and the computing resources. For example, one or more first operations may be provided to a first video processing location, while one or more second operations may be provided to second video processing location. In some implementations, the first video processing location may comprise a location that is closer in physical proximity to the video sources. For example, the first video processing location may perform first operations on the video data to determine whether the video data is of interest. If the video data is of interest, the video data may be communicated to the second video processing location to perform additional operations, such as data storage, metadata generation, image optimization, and the like.

In some implementations, the operations that are allocated to the various different processing locations may be dynamic based on a variety of factors. These factors may include updates to the processing requirements (e.g., adding operations, removing operations, and the like), updates the available resources, updates to the network connectivity between the processing locations, changes in cost associated with the use of a particular or any other similar update. In at least one implementation, an operation operating at the first processing location may trigger the deployment of additional operations at the second processing location. In another implementations, based on changes in the available computing resources, allocate module 610 may migrate operations between different processing locations or may modify the operations themselves.

In at least one example, the processing requirements may comprise a minimum quality of service associated with processing the video data. For example, the processing requirements may indicate a minimum quality of video to be stored at a first processing location. However, as additional CPU and/or storage resources are made available at the first processing location, changes may be made to the operations, permitting additional video data to be stored in better quality.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
determining two or more operations to be performed on video data from one or more video sources, wherein a first operation of the two or more operations identifies objects of interest in the video data, and wherein a second operation of the two or more operations formats the video data;
monitoring computing resources available at a first video processing location and at least one second video processing location, wherein the computing resources comprise CPU availability and memory availability, and wherein the at least one second video processing location comprises a cloud computing provider accessible over the internet from the first video processing location;
monitoring data processing costs in association with the at least one second video processing location, wherein the data processing costs comprise monetary costs associated with use of the cloud computing provider; and
allocating first video processing operations to the first video processing location and second video processing operations to the at least one second video processing location based on the two or more operations to be performed on the video data, the data processing costs, and the monitored computing resources, wherein the first video processing operations and the second video processing operations support the two or more operations to be performed on the video data.

2. The method of claim 1, wherein the one or more video sources comprise one or more cameras.

3. The method of claim 2, wherein the first video processing location is located on the one or more cameras.

4. The method of claim 1, wherein the first video processing location is nearer in physical proximity to the one or more video sources than the at least one second video processing location.

5. The method of claim 1 further comprising:
identifying a video portion of interest using the first video processing operations at the first video processing location; and
in response to identifying the video portion of interest, initiating third video processing operations at the at the at least one second video processing location.

6. The method of claim 1 further comprising:
monitoring one or more networking conditions between the first video processing location and the at least one second video processing location; and
wherein allocating the first video processing operations to the first video processing location and the second video processing operations to the at least one second video processing location is further based on the one or more networking conditions.

7. The method of claim 6, wherein the one or more networking conditions comprise bandwidth and/or latency.

8. A computing apparatus comprising:
a storage system;
a processing system operatively coupled to the storage system; and
program instructions stored on the storage system that, when executed by the processing system, direct the processing system to:
determine one or more operations to be performed on video data from one or more video sources, wherein an operation of the one or more operations identifies objects of interest in the video data;
monitor computing resources available at a first video processing location and at least one second video processing location, wherein the computing resources comprise CPU availability and memory availability, and wherein the at least one second video processing location comprises a cloud computing provider accessible over the internet from the first video processing location;
monitor data processing costs in association with the at least one second video processing location, wherein the data processing costs comprise monetary costs associated with use of the cloud computing provider; and
allocate first video processing operations to the first video processing location and second video processing operations to the at least one second video processing location based on the one or more operations to be performed on the video data, the data processing costs, and the monitored computing resources, wherein the first video processing operations and the second video processing operations support the one or more operations to be performed on the video data.

9. The computing apparatus of claim 8, wherein the one or more video sources comprise one or more cameras.

10. The computing apparatus of claim 9, wherein the first video processing location is located on the one or more cameras.

11. The computing apparatus of claim 8, wherein the first video processing location is nearer in physical proximity to the one or more video sources than the at least one second video processing location.

12. The computing apparatus of claim 8, wherein the program instructions further direct the processing system to:
identify a video portion of interest using the first video processing operations at the first video processing location; and
in response to identifying the video portion of interest, initiate third video processing operations at the at the at least one second video processing location.

13. The computing apparatus of claim 8, wherein the program instructions further direct the processing system to:
monitor one or more networking conditions between the first video processing location and the at least one second video processing location; and
wherein allocating the first video processing operations to the first video processing location and the second video processing operations to the at least one second video processing location is further based on the one or more networking conditions.

14. The computing apparatus of claim 13, wherein the one or more networking conditions comprise bandwidth and/or latency.

15. A system comprising:
one or more cameras; and
a management system comprising at least one computing system configured to:
determine one or more operations to be performed on video data from one or more video sources, wherein an operation of the one or more operations identifies objects of interest in the video data;

monitor computing resources available at a first video processing location and at least one second video processing location, wherein the computing resources comprise CPU availability and memory availability, and wherein the at least one second video processing location comprises a cloud computing provider accessible over the internet from the first video processing location;

monitor data processing costs in association with the at least one second video processing location, wherein the data processing costs comprise monetary costs associated with use of the cloud computing provider; and allocate first video processing operations to the first video processing location and second video processing operations to the at least one second video processing location based on the one or more operations to be performed on the video data, the data processing costs, and the monitored computing resources, wherein the first video processing operations and the second video processing operations support the one or more operations to be performed on the video data.

16. The system of claim 15, wherein the first video processing location is nearer in physical proximity to the one or more video sources than the at least one second video processing location.

17. The system of claim 15, wherein the management system is further configured to:
 identify a video portion of interest using the first video processing operations at the first video processing location; and
 in response to identifying the video portion of interest, initiate third video processing operations at the at the at least one second video processing location.

* * * * *